United States Patent
Ma et al.

(10) Patent No.: US 10,996,337 B2
(45) Date of Patent: May 4, 2021

(54) SYSTEMS AND METHODS FOR CONSTRUCTING A HIGH-DEFINITION MAP BASED ON LANDMARKS

(71) Applicant: BEIJING DIDI INFINITY TECHNOLOGY AND DEVELOPMENT CO., LTD., Beijing (CN)

(72) Inventors: Teng Ma, Beijing (CN); Sheng Yang, Beijing (CN); Xiaoling Zhu, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 16/928,030

(22) Filed: Jul. 14, 2020

(65) Prior Publication Data

US 2020/0341150 A1 Oct. 29, 2020

Related U.S. Application Data

(63) Continuation of application No. PCT/CN2018/125642, filed on Dec. 29, 2018.

(51) Int. Cl.
*G01S 17/89* (2020.01)
*G01C 21/00* (2006.01)
(Continued)

(52) U.S. Cl.
CPC ......... *G01S 17/89* (2013.01); *G01C 21/3852* (2020.08); *G01S 17/06* (2013.01);
(Continued)

(58) Field of Classification Search
USPC ....................................................... 701/400
See application file for complete search history.

(56) References Cited

U.S. PATENT DOCUMENTS 10,733,484 B2 * 8/2020 Shestak .................... G06K 9/66
2017/0344888 A1 11/2017 Sano et al.
(Continued)

FOREIGN PATENT DOCUMENTS

| CN | 107246876 A | 10/2017 |
| CN | 108038139 A | 5/2018 |

(Continued)

OTHER PUBLICATIONS

International Search Report in PCT/CN2018/125642 dated Sep. 26, 2019, 5 pages.

(Continued)

*Primary Examiner* — Tyler D Paige
(74) *Attorney, Agent, or Firm* — Bayes PLLC

(57) ABSTRACT

Embodiments of the disclosure provide systems and methods for updating an HD map. The system may include a communication interface configured to receive sensor data acquired of a target region by at least one sensor equipped on a vehicle as the vehicle travels along a trajectory via a network. The system may further include a storage configured to store the HD map. The system may also include at least one processor. The at least one processor may be configured to identify a plurality of data frames associated with a landmark, each data frame corresponding to one of a plurality of local HD map on the trajectory. The at least one processor may be further configured to jointly optimize pose information of the plurality of local HD maps and pose information of the landmark. The at least one processor may
(Continued)

be further configured to construct the HD map based on the based on the pose information of the plurality of local HD maps.

20 Claims, 5 Drawing Sheets

(51) Int. Cl.
    *G01S 17/06*     (2006.01)
    *G05D 1/02*     (2020.01)
    *G01S 19/03*     (2010.01)

(52) U.S. Cl.
    CPC ............ *G01S 19/03* (2013.01); *G05D 1/0274* (2013.01); *B60W 2420/52* (2013.01)

(56) References Cited

U.S. PATENT DOCUMENTS

| | | | |
|---|---|---|---|
| 2018/0188026 A1* | 7/2018 | Zhang | G06T 7/70 |
| 2018/0188037 A1* | 7/2018 | Wheeler | G06K 9/03 |
| 2018/0188738 A1* | 7/2018 | Tatourian | G05D 1/028 |
| 2018/0189323 A1* | 7/2018 | Wheeler | G06F 9/54 |
| 2019/0120947 A1* | 4/2019 | Wheeler | G01S 17/42 |
| 2019/0129431 A1* | 5/2019 | Yalla | G01C 21/00 |
| 2019/0146500 A1* | 5/2019 | Yalla | G01C 21/3602 |
| | | | 701/25 |
| 2019/0271549 A1* | 9/2019 | Zhang | G01C 21/20 |
| 2019/0291727 A1* | 9/2019 | Shalev-Shwartz | ........ |
| | | | G01C 21/3602 |
| 2019/0294934 A1* | 9/2019 | Shestak | G06K 9/66 |
| 2019/0392232 A1* | 12/2019 | Ma | G01S 17/89 |

FOREIGN PATENT DOCUMENTS

| | | |
|---|---|---|
| CN | 108303721 A | 7/2018 |
| CN | 108550318 A | 9/2018 |

OTHER PUBLICATIONS

Written Opinion in PCT/CN2018/125642 dated Sep. 26, 2019, 5 pages.

* cited by examiner

510

520

530

SYSTEMS AND METHODS FOR CONSTRUCTING A HIGH-DEFINITION MAP BASED ON LANDMARKS

CROSS-REFERENCE TO RELATED APPLICATIONS

This application is a Continuation of International Application No. PCT/CN2018/125642, filed on Dec. 29, 2018, the entire contents of which are hereby incorporated by reference.

TECHNICAL FIELD

The present disclosure relates to systems and methods for constructing a high-definition (HD) map, and more particularly to, systems and methods for constructing an HD map based on jointly optimizing pose information of a plurality of local HD maps and landmarks associated with the plurality of local HD maps.

BACKGROUND

Autonomous driving technology relies heavily on an accurate map. For example, accuracy of a navigation map is critical to functions of autonomous driving vehicles, such as positioning, ambiance recognition, decision making and control. Pose maps may be obtained mainly based on matching point cloud data and odometry of the vehicle. The odometry of the vehicle may be acquired by estimating the pose of the vehicle using a Global Positioning System (GPS) receiver and one or more Inertial Measurement Unit (IMU) sensors. Matching the point cloud data may be accomplished by scanning the geometry characteristics of the street which could ensure the global consistency of the HD map when the GPS signal is poor.

Current pose optimization methods do not consider the semantic interpretation of the point cloud data while matching different frames of point cloud data. Accordingly, the optimization methods are not accurate or efficient. Therefore, an improved system and method for constructing and updating an HD map is needed.

Embodiments of the disclosure address the above problems by methods and systems for constructing an HD map based on jointly optimizing pose information of a plurality of local HD maps and landmarks.

SUMMARY

Embodiments of the disclosure provide a method for constructing an HD map. The method may include receiving, by a communication interface, sensor data acquired of a target region by at least one sensor equipped on a vehicle as the vehicle travels along a trajectory, wherein the target region includes a landmark. The method may further include identifying, by at least one processor, a plurality of data frames associated with the landmark, each data frame corresponding to one of a plurality of local HD maps on the trajectory. The method may further include jointly optimizing, by the at least processor, pose information of the plurality of local HD maps and pose information of the landmark. The method may also include constructing, by the at least one processor, the HD map based on the pose information of the plurality of local HD maps.

Embodiments of the disclosure also provide a system for constructing an HD map. The system may include a communication interface configured to receive sensor data acquired of a target region by at least one sensor equipped on a vehicle as the vehicle travels along a trajectory via a network. The system may further include a storage configured to store the HD map. The system may also include at least one processor. The at least one processor may be configured to identify a plurality of data frames associated with a landmark, each data frame corresponding to one of a plurality of local HD map on the trajectory. The at least one processor may be further configured to jointly optimize pose information of the plurality of local HD maps and pose information of the landmark. The at least one processor may also be configured to construct the HD map based on the based on the pose information of the plurality of local HD maps.

Embodiments of the disclosure further provide a non-transitory computer-readable medium having instructions stored thereon that, when executed by one or more processors, causes the one or more processors to perform a method for constructing an HD map. The method may include receiving sensor data acquired of a target region by at least one sensor equipped on a vehicle as the vehicle travels along a trajectory, wherein the target region includes a landmark. The method may further include identifying a plurality of data frames associated with the landmark, each data frame corresponding to one of a plurality of local HD maps on the trajectory. The method may further include jointly optimizing pose information of the plurality of local HD maps and pose information of the landmark. The method may also include jointly optimizing pose information of the plurality of local HD maps and pose information of the landmark.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Embodiments of methods and systems for constructing an HD map based on jointly optimizing pose information of a plurality of local HD maps and landmarks are disclosed. Landmarks (e.g., road signs and traffic lines) have fixed locations in a global coordinate. Thus, different frames of point cloud data that include observations of the same landmarks may be matched through the common landmarks.

Further, based on the matching, the optimization method may establish many-to-many constraints between the common landmarks and the different frames of point cloud data. By doing so, the robustness and the accuracy of the HD map constructing method are improved.

Figure 1:
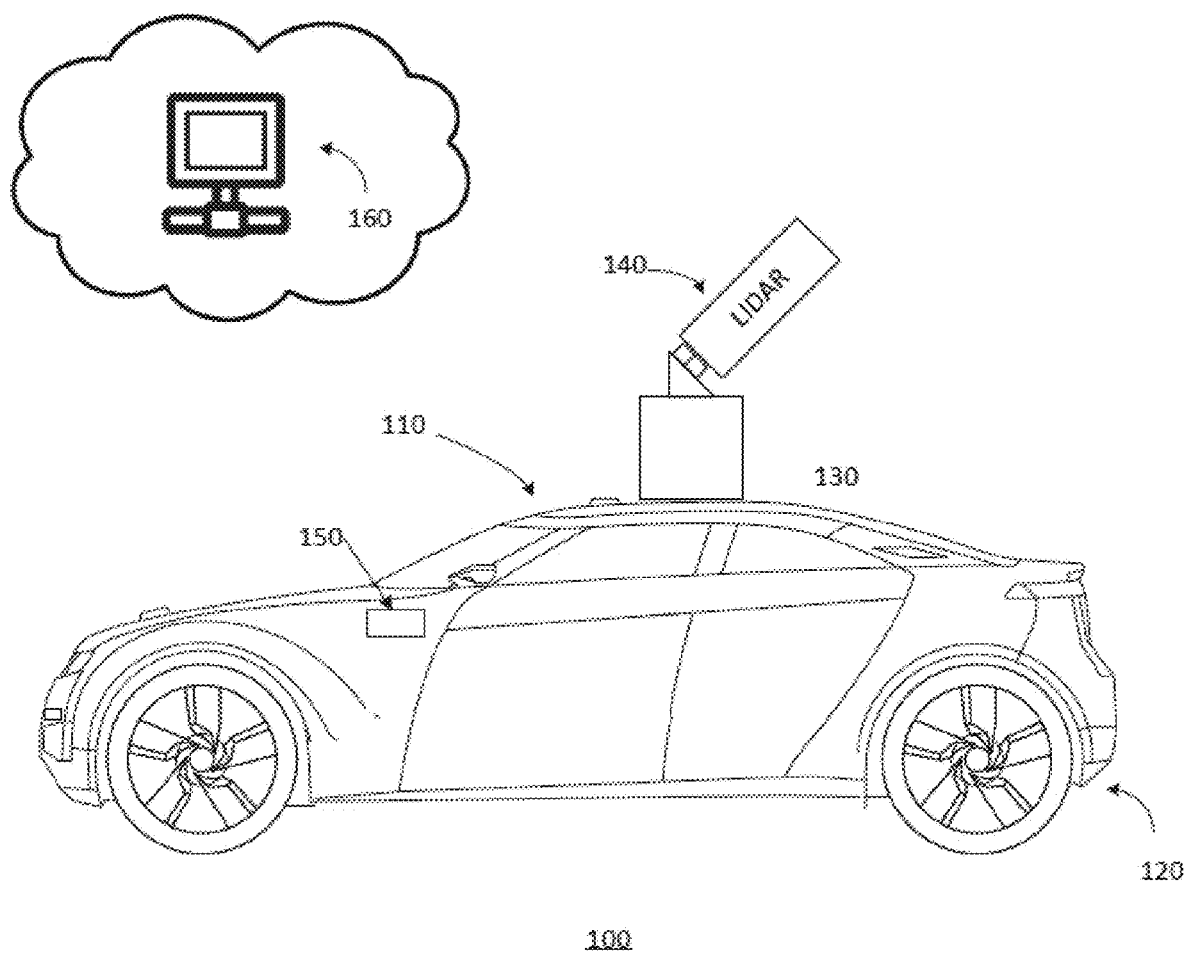
FIG. 1 illustrates a schematic diagram of an exemplary vehicle equipped with sensors, according to embodiments of the disclosure.

FIG. 1 illustrates a schematic diagram of an exemplary vehicle 100 having a plurality of sensors 140 and 150, according to embodiments of the disclosure. Consistent with some embodiments, vehicle 100 may be a survey vehicle configured for acquiring data for constructing an HD map or three-dimensional (3-D) city modeling. It is contemplated that vehicle 100 may be an electric vehicle, a fuel cell vehicle, a hybrid vehicle, or a conventional internal combustion engine vehicle. Vehicle 100 may have a body 110 and at least one wheel 120. Body 110 may be any body style, such as a sports vehicle, a coupe, a sedan, a pick-up truck, a station wagon, a sports utility vehicle (SUV), a minivan, or a conversion van. In some embodiments, vehicle 100 may include a pair of front wheels and a pair of rear wheels, as illustrated in FIG. 1. However, it is contemplated that vehicle 100 may have less wheels or equivalent structures that enable vehicle 100 to move around. Vehicle 100 may be configured to be all wheel drive (AWD), front wheel drive (FWR), or rear wheel drive (RWD). In some embodiments, vehicle 100 may be configured to be operated by an operator occupying the vehicle, remotely controlled, and/or autonomous.

As illustrated in FIG. 1, vehicle 100 may be equipped with various sensors 140 and 150. Sensor 140 may be mounted to body 110 via a mounting structure 130. Mounting structure 130 may be an electro-mechanical device installed or otherwise attached to body 110 of vehicle 100. In some embodiments, mounting structure 130 may use screws, adhesives, or another mounting mechanism. Vehicle 100 may be additionally equipped with sensor 150 inside or outside body 110 using any suitable mounting mechanisms. It is contemplated that the manners in which sensor 140 or 150 can be equipped on vehicle 100 are not limited by the example shown in FIG. 1 and may be modified depending on the types of sensors of 140/150 and/or vehicle 100 to achieve desirable sensing performance.

Consistent with some embodiments, sensors 140 and 150 may be configured to capture data as vehicle 100 travels along a trajectory. For example, sensor 140 may be a LiDAR scanner configured to scan the surrounding and acquire point clouds. LiDAR measures distance to a target by illuminating the target with pulsed laser light and measuring the reflected pulses with a sensor. Differences in laser return times and wavelengths can then be used to make digital 3-D representations of the target. The light used for LiDAR scan may be ultraviolet, visible, or near infrared. Because a narrow laser beam can map physical features with very high resolution, a LiDAR scanner is particularly suitable for HD map surveys. In some embodiments, a LiDAR scanner may capture point cloud.

As vehicle 100 travels along the trajectory, sensor 140 may continuously capture data. Each set of scene data captured at a certain time range is known as a data frame. For example, the point cloud data captured by a LiDAR may include multiple point cloud data frames corresponding to different time ranges. Each data frame also corresponds to a pose of the vehicle along the trajectory. Different data frames may be used to construct different local HD maps where in some embodiments, the different local HD maps may include the same landmarks. Because the same landmarks may have different pose information in different local HD maps due to the different observation angles and distances, such pose information may be matched and associated among the different local HD maps to facilitate construction of the HD map.

As illustrated in FIG. 1, vehicle 100 may be additionally equipped with sensor 150, which may include sensors used in a navigation unit, such as a GPS receiver and one or more IMU sensors. A GPS is a global navigation satellite system that provides geolocation and time information to a GPS receiver. An IMU is an electronic device that measures and provides a vehicle's specific force, angular rate, and sometimes the magnetic field surrounding the vehicle, using various inertial sensors, such as accelerometers and gyroscopes, sometimes also magnetometers. By combining the GPS receiver and the IMU sensor, sensor 150 can provide real-time pose information of vehicle 100 as it travels, including the positions and orientations (e.g., Euler angles) of vehicle 100 at each time point.

In some embodiments, the point cloud data acquired by the LiDAR unit of sensor 140 may be initially in a local coordinate system of the LiDAR unit and may need to be transformed into a global coordinate system (e.g. the longitude/latitude coordinates) for later processing. Vehicle 100's real-time pose information collected by sensor 150 of the navigation unit may be used for transforming the point cloud data from the local coordinate system into the global coordinate system by point cloud data registration, for example, based on vehicle 100's poses at the time each point cloud data frame was acquired. In order to register the point cloud data with the matching real-time pose information, sensors 140 and 150 may be integrated as an integrated sensing system such that the cloud point data can be aligned by registration with the pose information when they are collected. The integrated sensing system may be calibrated with respect to a calibration target to reduce the integration errors, including but not limited to, mounting angle error and mounting vector error of sensors 140 and 150.

Consistent with the present disclosure, sensors 140 and 150 may communicate with server 160. In some embodiments, server 160 may be a local physical server, a cloud server (as illustrated in FIG. 1), a virtual server, a distributed server, or any other suitable computing device. Consistent with the present disclosure, server 160 may construct an HD map. In some embodiments, the HD map may be constructed using point cloud data frames acquired by a LiDAR.

Consistent with the present disclosure, server 160 may construct the HD map based on point cloud data containing multiple data frames acquired of one or more landmarks within different local HD maps. Server 160 may receive the point cloud data, identify landmarks within the multiple frames of point cloud data that correspond to different local HD maps on the trajectory, jointly optimize the pose information of both the different local HD maps and the landmarks and construct HD maps based on the pose information of the different local HD maps. Server 160 may communicate with sensors 140, 150, and/or other components of vehicle 100 via a network, such as a Wireless Local Area Network (WLAN), a Wide Area Network (WAN), wireless networks such as radio waves, a cellular network, a satellite communication network, and/or a local or short-range wireless network (e.g., Bluetooth™).

Figure 2:
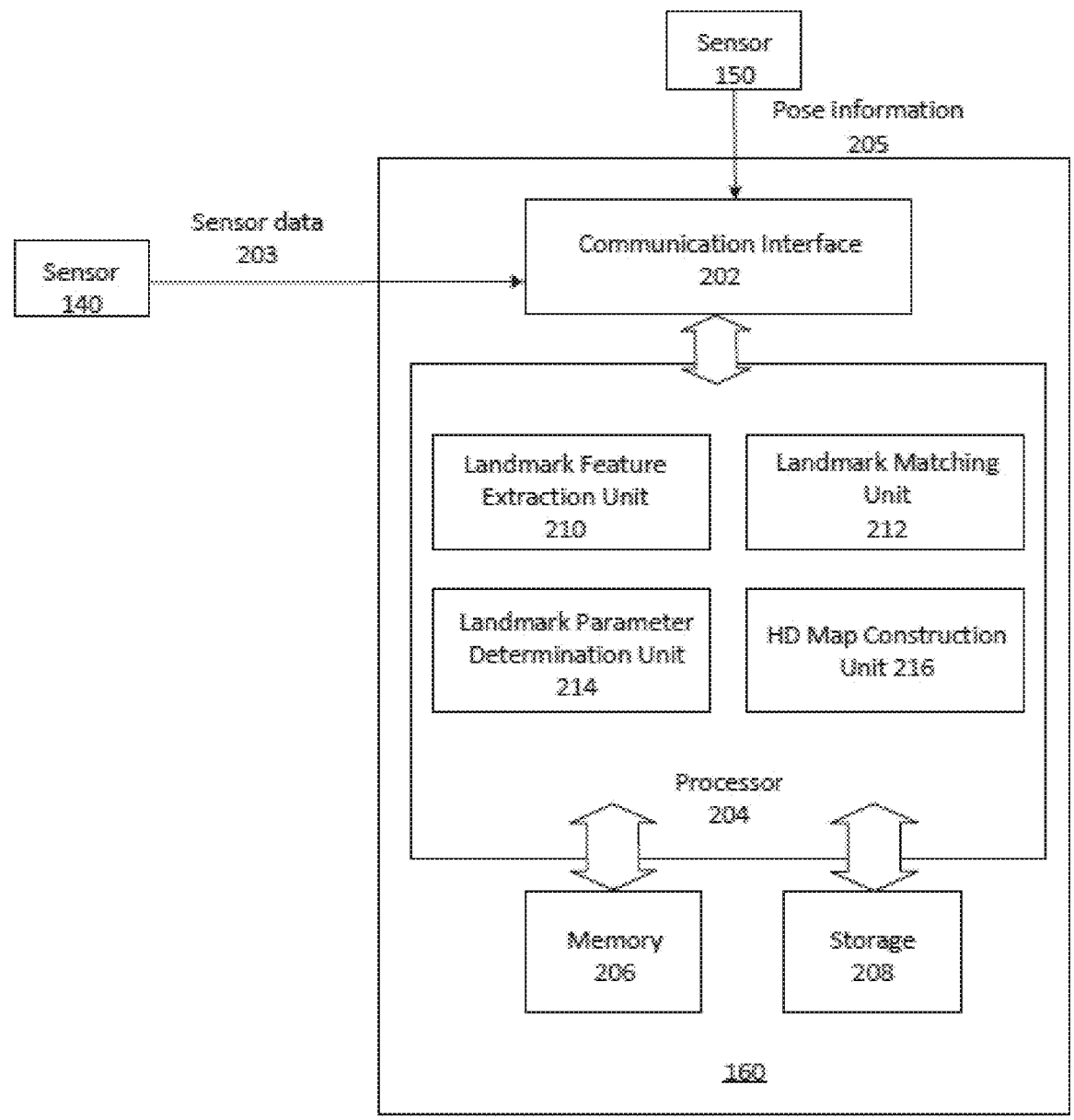
FIG. 2 illustrates a block diagram of an exemplary system for constructing an HD map, according to embodiments of the disclosure.

For example, FIG. 2 illustrates a block diagram of an exemplary server 160 for constructing an HD map, according to embodiments of the disclosure. Consistent with the present disclosure, server 160 may receive sensor data 203 from sensor 140 and vehicle pose information 205 from sensor 150. Based on sensor data 203, server 160 may identify data frames corresponding to different local HD maps on the trajectory associated with landmarks, jointly optimize the pose information of both the different local HD maps and the landmarks and construct HD maps based on the pose information of the different local HD maps.

In some embodiments, as shown in FIG. 2, server 160 may include a communication interface 202, a processor 204, a memory 206, and a storage 208. In some embodiments, server 160 may have different modules in a single device, such as an integrated circuit (IC) chip (implemented as an application-specific integrated circuit (ASIC) or a field-programmable gate array (FPGA)), or separate devices with dedicated functions. In some embodiments, one or more components of server 160 may be located in a cloud or may be alternatively in a single location (such as inside vehicle 100 or a mobile device) or distributed locations. Components of server 160 may be in an integrated device or distributed at different locations but communicate with each other through a network (not shown).

Communication interface 202 may send data to and receive data from components such as sensors 140 and 150 via communication cables, a Wireless Local Area Network (WLAN), a Wide Area Network (WAN), wireless networks such as radio waves, a cellular network, and/or a local or short-range wireless network (e.g., Bluetooth™), or other communication methods. In some embodiments, communication interface 202 can be an integrated services digital network (ISDN) card, cable modem, satellite modem, or a modem to provide a data communication connection. As another example, communication interface 202 can be a local area network (LAN) card to provide a data communication connection to a compatible LAN. Wireless links can also be implemented by communication interface 202. In such an implementation, communication interface 202 can send and receive electrical, electromagnetic or optical signals that carry digital data streams representing various types of information via a network.

Consistent with some embodiments, communication interface 202 may receive sensor data 203 such as point cloud data captured by sensor 140, as well as pose information 205 captured by sensor 150. Communication interface may further provide the received data to storage 208 for storage or to processor 204 for processing. Communication interface 202 may also receive a point cloud generated by processor 204 and provide the point cloud to any local component in vehicle 100 or any remote device via a network.

Processor 204 may include any appropriate type of general-purpose or special-purpose microprocessor, digital signal processor, or microcontroller. Processor 204 may be configured as a separate processor module dedicated to construct HD maps. Alternatively, processor 204 may be configured as a shared processor module for performing other functions unrelated to color point cloud generation.

As shown in FIG. 2, processor 204 may include multiple modules, such as a landmark feature extraction unit 210, a landmark matching unit 212, a landmark parameter determination unit 214, and an HD map construction unit 216, and the like. These modules (and any corresponding sub-modules or sub-units) can be hardware units (e.g., portions of an integrated circuit) of processor 204 designed for use with other components or software units implemented by processor 204 through executing at least part of a program. The program may be stored on a computer-readable medium, and when executed by processor 204, it may perform one or more functions. Although FIG. 2 shows units 210-216 all within one processor 204, it is contemplated that these units may be distributed among multiple processors located near or remotely with each other. For example, modules related to landmark identification, such as landmark feature extraction unit 210, landmark feature matching unit 212, landmark parameter determination unit 214, etc. may be within a processor on vehicle 100. Modules related to constructing HD map, such as HD map construction unit 216 may be within a processor on a remote server.

Landmark feature extraction unit 210 may be configured to extract landmark features from sensor data 203. In some embodiments, the landmark features may be geometric features of a landmark. Different methods may be used to extract the landmark features based on the type of the landmark. For example, the landmark may be a road mark (e.g., a traffic lane or pedestrian marks) or a standing object (e.g., a tree or road board).

Processor 204 may determine the type of the landmark. In some embodiments, if the landmark is determined to be a road mark, landmark feature extraction unit 210 may extract landmark features based on point cloud intensity of the landmarks. For example, landmark feature extraction unit 210 may use a Random Sample Consensus (RANSAC) method to segment the point cloud data associated with the road surface where the vehicle travels on. Because road marks are typically made using special labeling materials that correspond to high-intensity point clouds, landmark feature extraction unit 210 may extract features of the road marks based on the intensity of the point clouds. For example, landmark feature extraction unit 210 may use regional growing or clustering methods. In some other embodiments, if the landmark is determined to be a standing object, landmark feature extraction unit 210 may extract the landmark features based on a Principal Component Analysis (PCA) method. For example, landmark feature extraction unit 210, may use the PCA method to identify the neighbor area of the landmark so that the geometry features of the landmark may be identified, and landmark feature extraction unit 210 may use a combination of the geometry features to determine the landmark features.

Landmark feature matching unit 212 may be configured to match landmark features associated with the same landmark within different local HD maps. In some embodiments, landmark features may be matched using learning models trained based on sample landmark features that are known to be associated with a same landmark. For example, landmark feature matching unit 212 may use landmark features such as types, collection properties, and/or geometric features of the landmark as sample landmark features and combine the features with the associated vehicle pose to identify the landmark within different local HD maps. Landmark feature matching unit 212 may then train learning models (e.g., rule-based machine learning method) based on the sample landmark features that are associated with the same landmark. The trained model can then be applied to find matching landmark features.

Landmark parameter determination unit 214 may be configured to determine a set of parameters of the landmark based on the matched landmark features. In some embodiments, the set of parameters of the landmark may be determined based on the type of the landmark. For example, if the landmark is a line segment type object (e.g., a street light lamp stick), it may be represented with 4 or 6 degrees of freedom, including the line direction (2 degrees of freedom), tangential positions (2 degrees of freedom), and endpoints (0 or 2 degrees of freedom). As another example, if the landmark is symmetric type object (e.g., a tree or road board), it may be represented with 5 degrees of freedom, including the normal vector (2 degrees of freedom) and the spatial location of the landmark (3 degrees of freedom). For landmarks that are not the above two types of object, they may be represented with 6 degrees of freedom, including Euler angles (3 degrees of freedom) and the spatial location of the landmark (3 degrees of freedom).

HD map construction unit 216 may be configured to construct the HD map based on jointly optimizing the pose information of the landmarks and local HD maps. In some embodiments, the original pose map $G=\langle V,F\rangle$ is expanded to incorporate pose information and constraints of landmarks. For example, the collection of the optimization objects V is expanded to be $V=V_p \cup V_l$ where $V_p$ is the collection of the local HD maps pose information that needed to be optimized and where $V_l$ is the collection of the landmarks pose information that needed to be optimized (e.g., each element of V can be represent as $v_i \in SE(3)$). The collection of constraints may be expanded at the same time to incorporate constraints regarding landmarks as $F=F_{obs} \cup F_{odom} \cup F_{reg}$ where $F_{obs}$ is the collection of the constraints between the local HD map and the landmark based on the observation of the landmarks made from the local HD map, $F_{odom}$ is the collection of constraints based on the odometry of the local HD maps and $F_{reg}$ is the collection of constraints based on the registration of local HD maps.

Figure 3A:
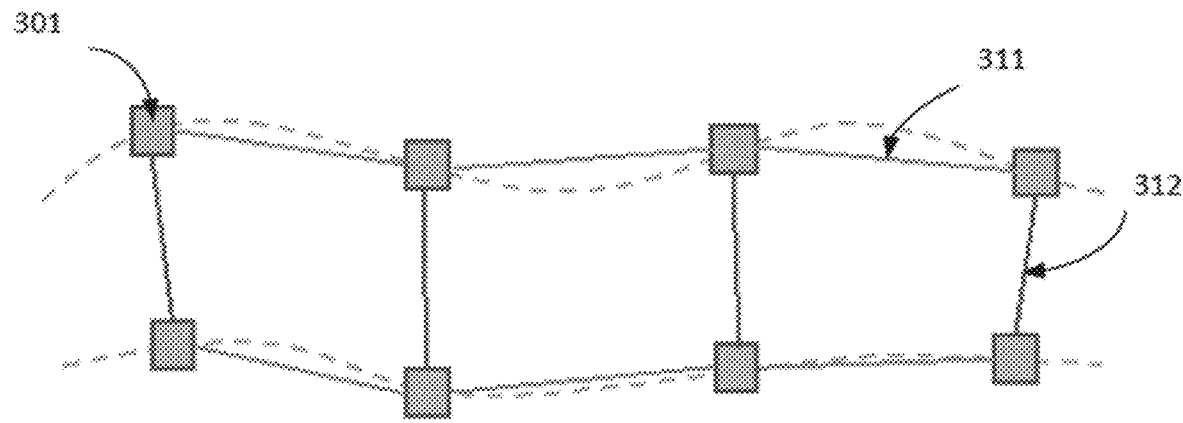
FIGS. 3A and 3B illustrate exemplary methods for jointly optimizing the poses of landmarks and poses of local HD maps, according to embodiments of the disclosure.

For example, as shown in FIG. 3A, local HD maps 301 on the same trajectory are connected to each other through constraints based on odometry $F_{odom}$ 311. Local HD maps 301 on different trajectories are connected through constraints based on registration of the local HD maps pose information $F_{reg}$ 312. In some embodiments, when different local HD maps are consecutive in time (e.g., are acquired when a service vehicle travels along a trajectory, and are next to each other), the constraints between the two different local HD map $F_{odom}$ may be established based on the odometry of the two local HD maps as is illustrated by constraints $F_{odom}$ 311 that roughly parallel to the broken line in FIG. 3A. The broken line represents a trajectory the vehicle travels along. When two different local HD maps are not on the same trajectory but share a same scene with each other, the constraints between the two local HD map $F_{re}$, may be established based on a registration of the two local HD map's pose information as is illustrated by constraints $F_{reg}$ 312 in FIG. 3A.

Figure 3B:
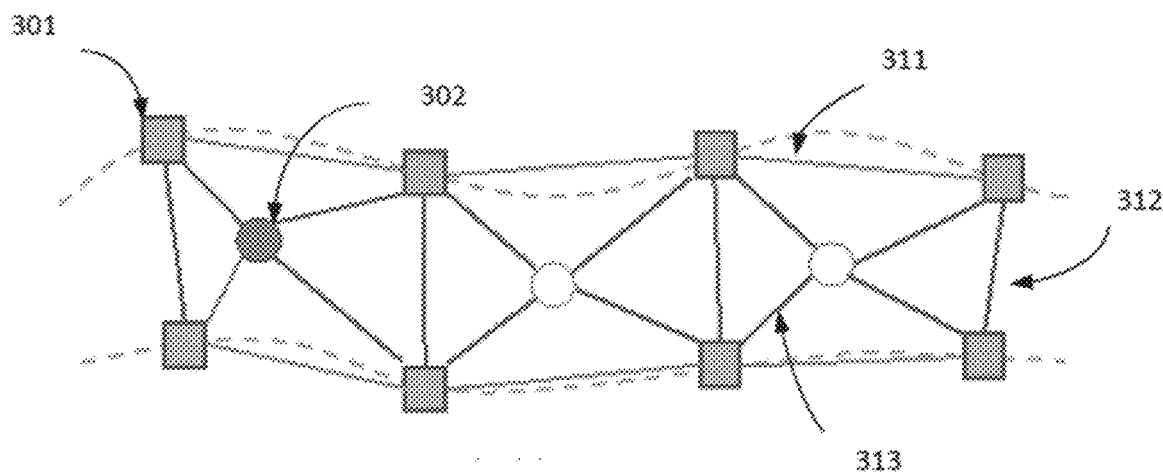

As shown in FIG. 3B, local HD maps 301 are further connected to landmarks 302 through constraints based on observations $F_{obs}$ 313. That is, when two different local HD maps neither are consecutive in time nor share any scene with each other, the constraints between the two local HD maps may still be established based on the observation of the same landmarks $F_{obs}$ 313 in FIG. 3B. By introducing the constraints based on the landmarks, the number of constraints between local HD maps may be substantially increased (e.g., there are 8 constraints in FIG. 3A in total, as opposed to 20 constraints in FIG. 3B in total).

As the number of elements in the collection of optimization object V and the number of constraints in the collection of constraints F increase, the robustness and precision of the HD map construction enhance as a result. For example, when the GPS positioning accuracy is at a decimeter level, the HD map can still be constructed at a centimeter level accuracy.

It is contemplated that processor 204 may include other modules in addition to units 210-216. In some embodiments, processor 204 may additionally include a sensor calibration unit (not shown) configured to determine one or more calibration parameters associated with sensor 140 or 150. In some embodiments, the sensor calibration unit may instead be inside vehicle 100, in a mobile device, or otherwise located remotely from processor 204. For example, sensor calibration may be used to calibrate a LiDAR scanner and the positioning sensor(s).

Memory 206 and storage 208 may include any appropriate type of mass storage provided to store any type of information that processor 204 may need to operate. Memory 206 and storage 208 may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM. Memory 206 and/or storage 208 may be configured to store one or more computer programs that may be executed by processor 204 to perform HD map construction functions disclosed herein. For example, memory 206 and/or storage 208 may be configured to store program(s) that may be executed by processor 204 to construct an HD map based on sensor data captured by sensors 140 and 150.

Memory 206 and/or storage 208 may be further configured to store information and data used by processor 204. For instance, memory 206 and/or storage 208 may be configured to store the various types of sensor data (e.g., point cloud data frames, pose information, etc.) captured by sensors 140 and 150 and the HD map. Memory 206 and/or storage 208 may also store intermediate data such as machine learning models, landmark features, and sets of parameters associated with the landmarks, etc. The various types of data may be stored permanently, removed periodically, or disregarded immediately after each frame of data is processed.

Figure 4:
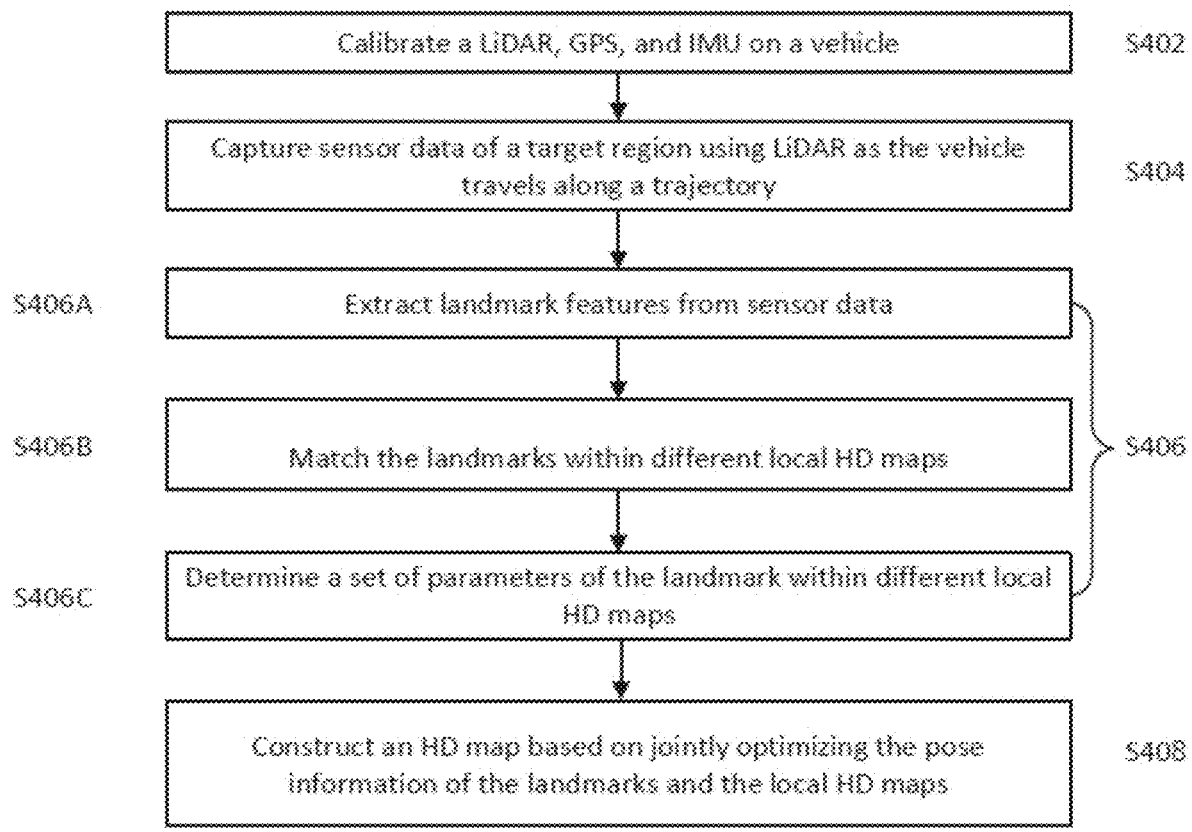
FIG. 4 illustrates a flowchart of an exemplary method for constructing an HD map, according to embodiments of the disclosure.

FIG. 4 illustrates a flowchart of an exemplary method 400 for constructing an HD map, according to embodiments of the disclosure. In some embodiments, method 400 may be implemented by a HD map construction system that includes, among other things, server 160 and sensors 140 and 150. However, method 400 is not limited to that exemplary embodiment. Method 400 may include steps S402-S408 as described below. It is to be appreciated that some of the steps may be optional to perform the disclosure provided herein. Further, some of the steps may be performed simultaneously, or in a different order than shown in FIG. 4.

In step S402, one or more of sensors 140 and 150 may be calibrated. In some embodiments, vehicle 100 may be dispatched for a calibration trip to collect data used for calibrating sensor parameters. Calibration may occur before the actual survey is performed for constructing and/or updating the map. Point cloud data captured by a LiDAR (as an example of sensor 140) and pose information acquired by positioning devices such as a GPS receiver and one or more IMU sensors may be calibrated.

In step S404, sensors 140 and 150 may capture sensor data 203 and pose information 205 as vehicle 100 travels along a trajectory. In some embodiments, sensor data 203 of the target region may be point cloud data. Vehicle 100 may be equipped with sensor 140, such as a LiDAR laser scanner to capture sensor data 203. As vehicle 100 travels along the trajectory, sensor 140 may continuously capture frames of sensor data 203 at different time points to obtain point cloud data frames. Vehicle 100 may be also equipped with sensor 150, such as a GPS receiver and one or more IMU sensors. Sensors 140 and 150 may form an integrated sensing system. In some embodiments, when vehicle 100 travels along the trajectory in the natural scene and when sensor 140 captures the set of point cloud data indicative of the target region, sensor 150 may acquire real-time pose information of vehicle 100.

In some embodiments, the captured data, including e.g., sensor data 203 and pose information 205, may be transmitted from sensors 140/150 to server 160 in real-time. For example, the data may be streamed as they become available. Real-time transmission of data enables server 160 to process the data frame by frame in real-time while subsequent frames are being captured. Alternatively, data may be transmitted in bulk after a section of, or the entire survey, is completed.

In step S406, processor 204 may identify same landmarks within different local HD maps constructed based on the different sensor data frames. In step S406A, processor 204 may extract landmark features from the sensor data. In some embodiments, landmarks may be extracted based on the type of the landmarks. For example, processor 204 may determine if the landmarks are road marks (e.g., traffic lanes), or standing objects (e.g., trees or road boards). In some embodiments, if the landmarks are determined to be road marks, processor 204 may identify the landmarks based on point cloud intensity of the landmarks. For example, landmark feature extraction unit 210 may segment the sensor data using RANSAC algorithm. Based on the segment, processor 204 may further identify the landmarks based on the point cloud intensity of the landmarks.

Figure 5:
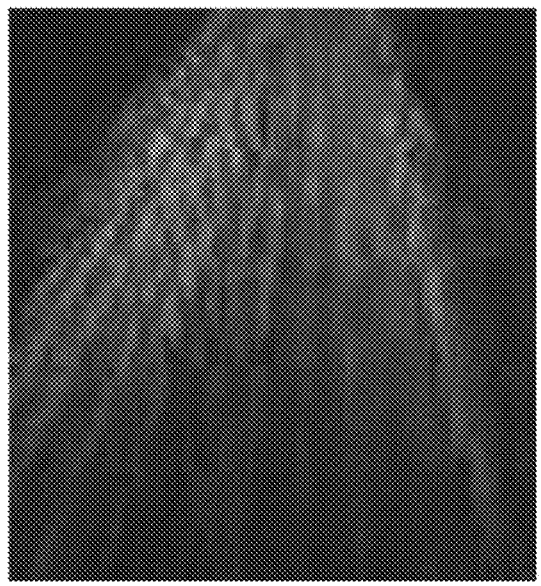
FIG. 5 illustrates an exemplary point cloud frame of landmarks within a local HD map, according to embodiments of the disclosure.
Figure 5:
Figure 5:

For example, FIG. 5 illustrates exemplary point clouds 510 and 520 of the same target region before and after point cloud intensity identification of the landmarks, respectively, according to embodiments of the disclosure. Point cloud 510 of the road marks shows data collected by sensors 140 and 150 before point cloud intensity identification. In contrast, point cloud 520 of the same road marks shows data re-generated after point cloud intensity identification (e.g., using RANSAC algorithm to segment the sensor data). For example, the landmarks (road marks) are more distinguishable in point cloud 520 than the same landmarks (road marks) shown in point cloud 510 since the sensor data collected by sensors 140 and 150 are filtered to reduce noise by the RANSAC method.

In some other embodiments, if the landmarks are determined to be standing objects, processor 204 may identify the landmarks based on a PCA method. For example, processor 204 may use an orthogonal transformation to convert a set of observations of possibly correlated variables (e.g., point cloud data of the nearby area of the landmarks) into a set of values of linearly uncorrelated variables of the landmarks. For example, FIG. 5 illustrates an exemplary point cloud 530 after using PCA method to extract standing objects.

In step S406B, processor 204 may be configured to match the landmark features among the different local HD maps. In some embodiments, landmark features may be matched using learning models trained based on sample landmark features that are known to be associated with a same landmark. For example, processor 204 may use landmark features such as types, collection properties, and/or geometric features as sample landmark features and combine the features with the associated vehicle pose to identify the landmark within different local HD maps. Processor 204 may then train learning models (e.g., using rule-based machine learning method) based on the sample landmark features of a matched landmark. The trained model may be applied to match landmark features associated with the same landmark.

In step S406C, processor 204 may determine a set of parameters associated with the landmark. In some embodiments, the set of parameters of the landmark may be determined based on the type of the landmark.

For example, if the landmark is a line segment type object (e.g., a street light lamp stick), it may be represented with 4 or 6 degrees of freedom, including the line direction (2 degrees of freedom), tangential positions (2 degrees of freedom), and endpoints (0 or 2 degrees of freedom). As another example, if the landmark is symmetric type object (e.g., a tree or road board), it may be represented with 5 degrees of freedom, including the normal vector (2 degrees of freedom) and the spatial location of the landmark (3 degrees of freedom). For landmarks that are not the above two types of object, they may be represented with 6 degrees of freedom, including Euler angles (3 degrees of freedom) and the spatial location of the landmark (3 degrees of freedom).

In step S408, processor 204 may construct an HD map by jointly optimizing pose information of the landmarks and the local HD maps. In some embodiments, the original pose map G may be represented as $G=\langle V, F \rangle$. V is the collection of the pose information of each point (e.g., points may be local HD maps and/or landmarks) within the pose map and may be expanded as $V=V_p \cup V_l$, where $V_p$ is the collection of pose information of the local HD maps that needed to be optimized and where $V_l$ is the collection of the pose information of the landmarks that needed to be optimized (e.g., each element of V can be represent as $v_i \in SE(3)$). At the same time, the collection of constraints F may also be expanded to be $F=F_{obs} \cup F_{odom} \cup F_{reg}$. $F_{obs}$ is the collection of the constraints between the local HD maps and the landmarks based on the observation of the landmarks made from the local HD maps, $F_{odom}$ is the collection of the constraints based on odometry of the local HD maps and $F_{reg}$ is the collection of the constraints based on registration of the local HD maps. Based on the collection of constraints $F=F_{obs} \cup F_{odom} \cup F_{reg}$, the collection of the local HD map pose information $V_p$ and landmark pose information $V_l$ can be optimized jointly.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. A method for constructing an HD map, comprising:
receiving, by a communication interface, sensor data acquired during a survey of a target region that includes a landmark by at least one sensor equipped on a survey vehicle as the survey vehicle travels along a trajectory;

identifying, by at least one processor, a plurality of data frames associated with the landmark, each data frame corresponding to one of a plurality of local HD maps on the trajectory;

determining, by the at least one processor, a joint collection of pose information of the plurality of local HD maps and pose information of the landmark subject to a joint collection of constraints of the plurality of local HD maps and the landmark; and constructing, by the at least one processor, the HD map based on the pose information of the plurality of local HD maps.

2. The method of claim 1, wherein the joint collection of constraints comprises a first set of constraints determined based on observations made of the landmark and from the plurality of local HD maps.

3. The method of claim 2, further comprising:
determining a set of parameters of the landmark within each identified data frame;
determining the first set of constraints based on the sets of parameters of the landmark associated with the plurality of local HD maps.

4. The method of claim 2, wherein the joint collection of constraints further comprises a second set of constraints determined based on an odometry of the plurality of local HD maps.

5. The method of claim 2, wherein the joint collection of constraints further comprises a third set of constraints determined based on a registration of the plurality of local HD maps.

6. The method of claim 3, wherein the set of parameters of the landmark includes a direction, a tangent and an endpoint of the landmark.

7. The method of claim 3, wherein the set of parameters of the landmark includes Euler angles and a spatial location of the landmark within the target region.

8. The method of claim 3, wherein the set of parameters of the landmark includes a normal vector and a spatial location of the landmarks.

9. A system for constructing an HD map, comprising:
a communication interface configured to receive sensor data acquired during a survey of a target region by at least one sensor equipped on a survey vehicle as the survey vehicle travels along a trajectory via a network;
a storage configured to store the HD map; and
at least one processor configured to:
identify a plurality of data frames associated with a landmark, each data frame corresponding to one of a plurality of local HD map on the trajectory;
determine a joint collection of pose information of the plurality of local HD maps and pose information of the landmark subject to a joint collection of constraints of the plurality of local HD maps and the landmark; and
construct the HD map based on the pose information of the plurality of local HD maps.

10. The system of claim 9, wherein the joint collection of constraints comprises a first set of constraints determined based on observations made of the landmark and from the plurality of local HD maps.

11. The system of claim 10, wherein the at least one processor is further configured to:
determine a set of parameters of the landmarks within each identified data frame;
determine the first set of constrains based on the sets of parameters of the landmark associated with the plurality of local maps.

12. The system of claim 10, wherein the joint collection of constraints further comprises a second set of constraints determined based on odometry of the plurality of local HD maps.

13. The system of claim 10, wherein the joint collection of constraints further comprises a second set of constraints determined based on a registration of the plurality of local HD maps.

14. The system of claim 11, wherein the set of parameters of the landmark includes a direction, a tangent and an endpoint of the landmark.

15. The system of claim 11, wherein the set of parameters of the landmark includes Euler angles and a spatial location of the landmark within the target region.

16. The system of claim 11, wherein the set of parameters of the landmark includes a normal vector and a spatial location of the landmarks.

17. A non-transitory computer-readable medium having a computer program stored thereon, wherein the computer program, when executed by at least one processor, performs a method for constructing an HD map, the method comprising:
receiving sensor data acquired during a survey of a target region that includes a landmark by at least one sensor equipped on a survey vehicle as the survey vehicle travels along a trajectory;
identifying a plurality of data frames associated with the landmark, each data frame corresponding to one of a plurality of local HD maps on the trajectory;
determining, a joint collection of pose information of the plurality of local HD maps and pose information of the landmark subject to a joint collection of constraints of the plurality of local HD maps and the landmark; and
constructing the HD map based on the pose information of the plurality of local HD maps.

18. The non-transitory computer-readable medium of claim 17, wherein the joint collection of constraints comprises a first set of constraints determined based on observations made of the landmark and from the plurality of local HD maps.

19. The non-transitory computer-readable medium of claim 18, further comprising:
determining a set of parameters of the landmark within each identified data frame;
determining the first set of constraints based on the sets of parameters of the landmark associated with the plurality of local HD maps.

20. The non-transitory computer-readable medium of claim 18, wherein the joint collection of constraints further comprises a second set of constraints determined based on an odometry of the plurality of local HD maps and a third set of constraints based on a registration of the plurality of local HD maps.

* * * * *